United States Patent

Harris, III

(10) Patent No.: US 9,192,096 B2
(45) Date of Patent: Nov. 24, 2015

(54) ELECTRIC LAWN TRACTOR POWER MANAGEMENT SYSTEM AND METHOD

(75) Inventor: Troy W. Harris, III, Charlotte, NC (US)

(73) Assignee: DEERE & COMPANY, Moline, IL (US)

( * ) Notice: Subject to any disclaimer, the term of this patent is extended or adjusted under 35 U.S.C. 154(b) by 129 days.

(21) Appl. No.: 13/601,000

(22) Filed: Aug. 31, 2012

(65) Prior Publication Data

US 2014/0067172 A1 Mar. 6, 2014

(51) Int. Cl.
*A01D 34/00* (2006.01)

(52) U.S. Cl.
CPC .......... *A01D 34/008* (2013.01); *Y02T 10/7258* (2013.01)

(58) Field of Classification Search
None
See application file for complete search history.

(56) References Cited

U.S. PATENT DOCUMENTS

| | | | |
|---|---|---|---|
| 5,794,422 A | 8/1998 | Reimers et al. | |
| 5,937,622 A | 8/1999 | Carrier et al. | |
| 6,750,622 B2 | 6/2004 | Simizu et al. | |
| 6,892,517 B2 | 5/2005 | Adams et al. | |
| 7,275,355 B2 | 10/2007 | Adams et al. | |
| 8,076,873 B1* | 12/2011 | Lucas et al. | 318/107 |
| 2008/0098703 A1* | 5/2008 | Lucas et al. | 56/11.9 |
| 2008/0103635 A1 | 5/2008 | Vuk et al. | |
| 2009/0201650 A1* | 8/2009 | Hauser et al. | 361/736 |
| 2011/0043143 A1* | 2/2011 | Alter | 318/3 |
| 2012/0109440 A1 | 5/2012 | Wyatt et al. | |
| 2013/0104509 A1* | 5/2013 | MacKinnon et al. | 56/10.2 R |
| 2014/0013722 A1* | 1/2014 | Pitcel et al. | 56/10.6 |

FOREIGN PATENT DOCUMENTS

| | | | |
|---|---|---|---|
| EP | 1647175 A1 | 4/2006 | |
| EP | 1859669 A1 | 11/2007 | |
| EP | 2425701 A2 | 3/2012 | |

OTHER PUBLICATIONS

European Search Report dated Dec. 12, 2013 (5 pages).

* cited by examiner

*Primary Examiner* — John R Olszewski
*Assistant Examiner* — Jess Whittington

(57) ABSTRACT

An electric lawn tractor power management system and method including a power management switch having a normal mode setting and a power management mode setting. In response to actuation of the power management switch to the power management mode setting, a blade motor controller commands a blade motor to rotate at a power management speed lower than a normal speed, and a traction drive motor controller commands a traction drive motor to rotate up to a maximum power management speed lower than a normal maximum speed. At least one persistence counter notifies the controllers if excess loading conditions exist on the blade motor or traction drive motor. The controllers change the speeds and/or response of the blade motor and traction drive motor in response to the excess loading conditions.

5 Claims, 2 Drawing Sheets

ELECTRIC LAWN TRACTOR POWER MANAGEMENT SYSTEM AND METHOD

FIELD OF THE INVENTION

This invention relates to an electric lawn tractor power management system and method.

BACKGROUND

With electric lawn tractors and mowers, run time is critical to completing mowing or other operating tasks. Charging batteries or other stored energy sources may be inconvenient to operators, and charge times are generally lengthy, which may reduce productivity and reduce available time for mowing or other operating tasks. Operators may have no capability to manage electric lawn tractor operation to maximize run time before batteries need to be recharged. Efforts to manage power used in an electric lawn tractor to maximize run time may be an unwanted or unnecessary distraction for operators who have their attention on mowing or other operating tasks. A method and system for managing power used in an electric lawn tractor or similar electrically powered work vehicle is needed to maximize run times and result in more effective use of stored energy. An electric lawn tractor power management system and method is needed that can automatically adjust power usage to maximize run time before batteries must be charged.

SUMMARY OF THE INVENTION

An electric lawn tractor power management system and method includes a power management switch having a normal mode setting and a power management mode setting. A blade motor controller commands a blade motor to rotate at a power management speed that is lower than a normal speed in response to actuation of the power management switch to the power management mode setting. A traction drive motor controller commands a traction drive motor to rotate up to a maximum power management speed that is lower than a normal maximum speed in response to actuation of the power management switch to the power management mode setting. At least one persistence counter notifies the blade motor controller and/or traction drive motor controller if any excess loading conditions exist on the blade motor or the traction drive motor. The blade motor controller and/or traction drive motor controller change the speeds and/or response of the blade motor and traction drive motor in response to the excess loading conditions.

DESCRIPTION OF THE PREFERRED EMBODIMENT

Figure 1:
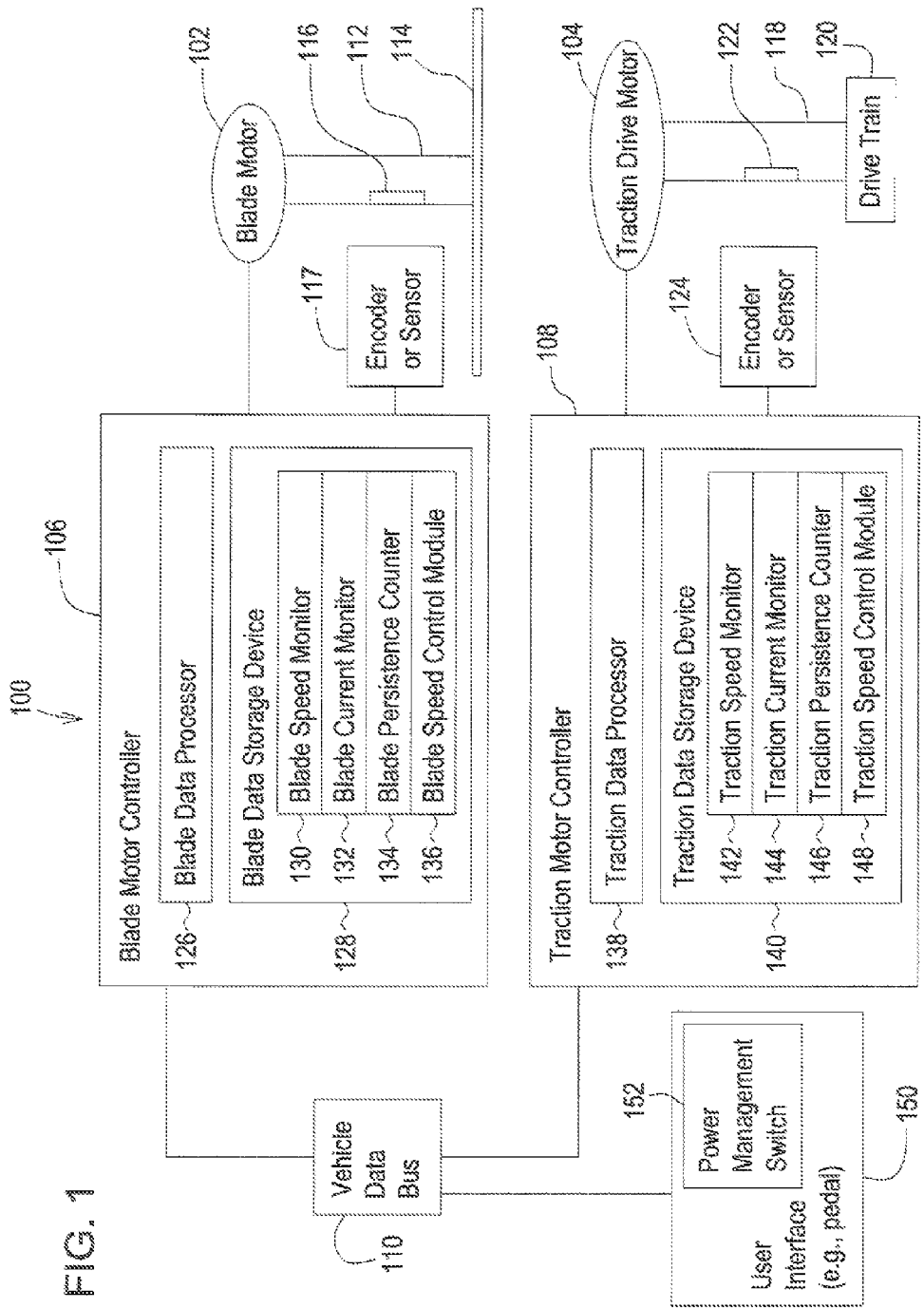
FIG. 1 is a block diagram of an electric lawn tractor power management system according to one embodiment.

FIG. 1 illustrates one embodiment of electric lawn tractor power management system 100 for optimizing electric power usage. An operator may elect to use the power management system, or normal settings for one or more electric blade motors and traction drive motors. In the power management mode, the electric lawn tractor or mower may operate in a manner that reduces or minimizes electric power consumption. For example, compared to normal settings, the electric lawn tractor power management system may reduce the speed of electric blade motor(s) 102 that rotate one or more cutting blades for mowing grass or other vegetation, and also may reduce the maximum speed, acceleration and response rate of electric traction drive motor(s) 104 that drive one or more ground engaging wheels to propel the vehicle over the ground surface.

In one embodiment, the electric lawn tractor power management system may detect high loading conditions of the electric blade motor(s) in the power management mode, and may increase the speed of electric blade motor(s) and/or reduce the speed of electric traction drive motor(s) in response to high loading conditions. Additionally, the electric lawn tractor power management system may detect high loading conditions of the traction drive motor, and may reduce the traction drive speed or dampen the response to the operator interface.

In one embodiment, the electric lawn tractor power management system may provide normal settings for the electric motors in the normal operating mode, and power management settings in the power management mode. In the power management mode, the power management system may control or reduce the power usage of the electric blade motor(s) that rotate one or more cutting blades, and the electric traction drive motor(s) that provide traction drive. The power management system may control the power usage of a plurality of cutting blade motors and/or traction drive motors. The power management system may reduce the speed of each blade motor and traction drive motor to minimize or reduce electric power consumption and also achieve or satisfy certain pre-specified performance criteria.

In one embodiment, the blade and traction drive motors each may comprise a brushless direct current (BLDC) motor, which facilitates high torque in a small package. A BLDC motor may comprise an integral inverter that drives a multi-phase alternating current motor portion, for example. However, in other embodiments that fall within the scope of the appended claims, the motors may comprise any direct current motor, alternating current motor, a multiple phase alternating current motor, an electronically commutated motor, a switched reluctance motor, an induction motor, synchronous motor, permanent magnet motor, or other type of electric motor.

In one embodiment, the electric lawn tractor power management system may include blade motor controller 106 and traction drive motor controller 108. The blade motor controller may be coupled to blade motor 102 and the traction drive motor controller may be coupled to traction drive motor 104. The blade motor controller and the traction drive motor controller may be coupled to vehicle data bus 110. The blade motor controller and the traction drive motor controller may communicate with each other via the vehicle data bus. However, in an alternate embodiment the motor controllers may communicate with each other via a transmission line or a wireless link.

In alternative embodiments, the electric lawn tractor power management system may include a vehicle controller instead of a separate blade motor controller and traction drive motor controller. Or the power management system may be implemented with multiple blade motor controllers if the electric lawn tractor or mower includes multiple cutting units. Thus, the power management system is not limited to any specific configuration of controllers described in this specification. Instead, the power management system is intended to include within its scope other configurations of electric lawn tractors or mowers that can operate using either normal settings or power management settings and, in the power management mode, can change motor speed or performance in response to high or excess loading detected from operational data of the blade motor and/or traction drive motor.

In one embodiment, blade motor 102 may have shaft 112 that is attached, directly or indirectly, or coupled to cutting blade 114. Magnet 116 may be embedded into or secured to blade shaft 112, while encoder 117 or sensor may be adapted to measure or detect the change in magnetic field associated with the rotation of magnet 116 to provide an estimate of a rotational speed or rotational velocity of blade shaft 112. In an alternate embodiment, magnet 116 and encoder 117 may be replaced with another type of sensor, such as an optical sensor, a pulse encoder, a gear driven sensor, or a contact sensor. Alternatively, an encoder or sensor may be built into the blade motor itself.

In one embodiment, traction drive motor 104 may have shaft 118 that is attached, directly or indirectly, or coupled to traction drive or a drive train 120 of an electric lawn tractor. Magnet 122 may be embedded into or secured to shaft 118, while encoder 124 or sensor may be adapted to measure or detect the change in magnetic field associated with the rotation of magnet 122 to provide an estimate of a rotational speed or rotational velocity of shaft 118. Additionally, the traction drive motor controller may determine the acceleration of the shaft or deceleration of the shaft. In an alternate embodiment, magnet 122 and encoder 124 may be replaced with another type of motor speed sensor, such as an optical sensor, a gear driven sensor, or a contact sensor. Or the encoder or sensor may be built into the traction drive motor.

In one embodiment, blade motor controller 106 may comprise blade data processor 126 and blade data storage device 128. Blade data processor 126 may comprise a microprocessor, a microcontroller, a programmable logic array, a logic circuit, an arithmetic logic unit, an application specific integrated circuit, a digital signal processor, or another data processor. Blade data storage device 128 may comprise electronic memory, non-volatile electronic memory, random access memory, an electronically erasable programmable memory, a magnetic storage device, an optical storage device, a magnetic disc drive, an optical disc drive, or another data storage device. Blade data storage device 128 may store or contain software instructions or software modules for blade speed monitor 130, blade current monitor 132, blade persistence counter 134, and blade speed control module 136. In an alternate embodiment, one or more software modules of blade data storage device 128 may be replaced with equivalent electronic modules.

In one embodiment, traction drive motor controller 108 may comprise traction data processor 138 and traction data storage device 140. Traction data processor 138 may comprise a microprocessor, a microcontroller, a programmable logic array, a logic circuit, an arithmetic logic unit, an application specific integrated circuit, a digital signal processor, or another data processor. Traction data storage device 140 may comprise electronic memory, non-volatile electronic memory, random access memory, an electronically erasable programmable memory, a magnetic storage device, an optical storage device, a magnetic disc drive, an optical disc drive, or another data storage device. Traction data storage device 140 may store or contain software instructions or software modules for traction speed monitor 142, traction current monitor 144, traction persistence counter 146, and traction speed control module 148. For example, the traction data storage device may include a function or look up table for motor speed as a function of user interface position, for the normal mode, the power management mode, and any other modes. In an alternate embodiment, one or more of the software modules of the traction data storage device may be replaced with equivalent electronic modules.

In one embodiment, a current sensor in each electric motor may provide current data or current sampling for processing by each current monitor, where such current samples may pertain to one or more phases or windings of the motor. The current sensors may be in each electric motor or controller.

In one embodiment, traction drive motor controller 108 may provide commanded speeds of a first rotor of traction drive motor 104. The commanded speeds may be provided by an operator via input from user interface 150 coupled to vehicle data bus 110. User interface 150 may comprise a controller associated with a keypad, a foot pedal, a throttle setting, one or more switches, a user controllable variable resistor, a user controllable variable capacitor, a console, display, dial, keyboard, or touch-screen display for entering a commanded speed, a requested speed, or another control input for power management system 100 or traction drive motor controller 108.

Figure 2:
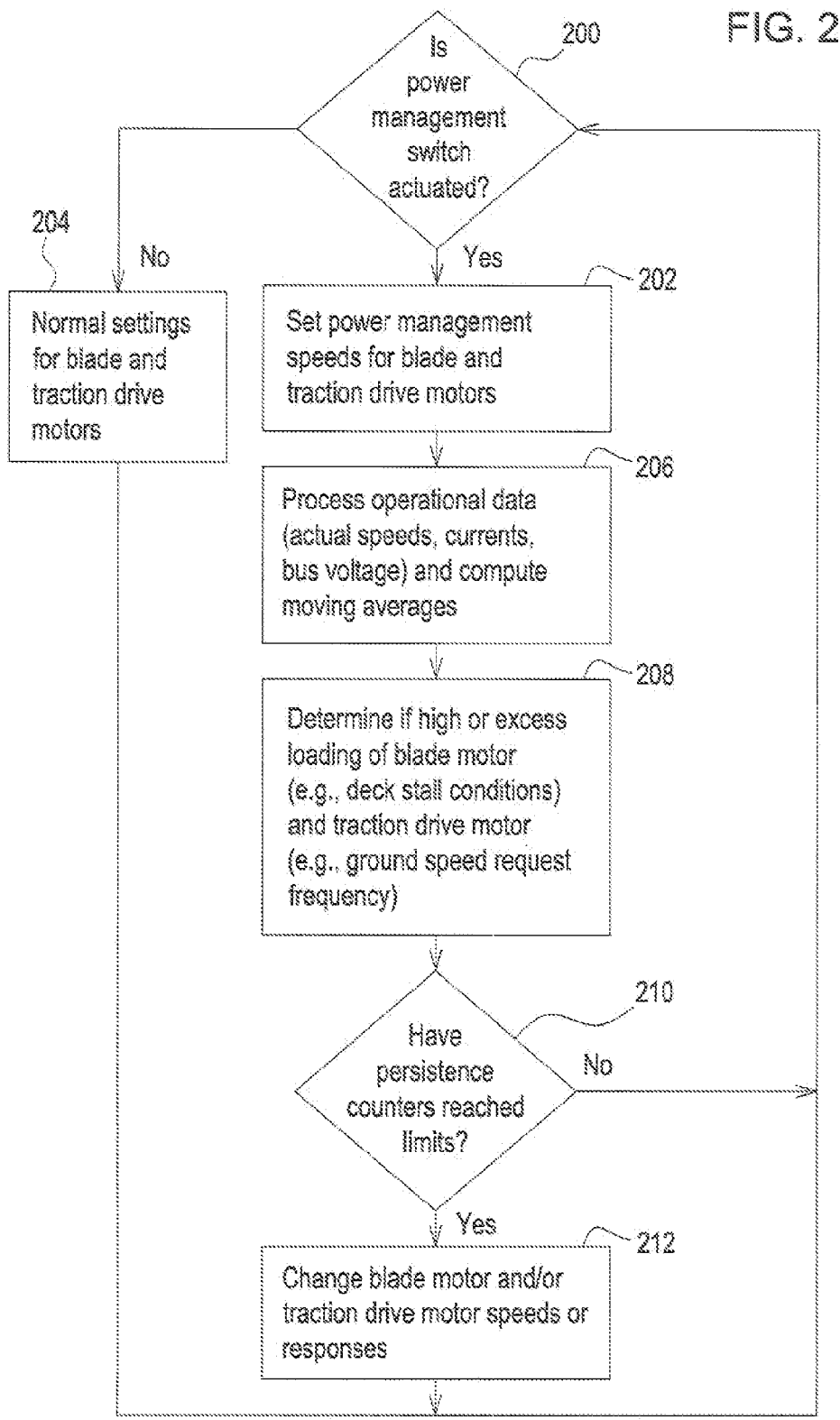
FIG. 2 is a logic flowchart of an electric lawn tractor power management system according to one embodiment.

In one embodiment, an operator may activate and use electric lawn tractor power management system 100 by actuating power management mode switch 152 that may be on or adjacent the user interface. The power management system may operate according to the logic in the flowchart of FIG. 2. In block 200, the state of power management mode switch 152 may be checked.

In one embodiment, if power management mode switch 152 is in the actuated or on position, in block 202 the traction drive motor controller may set the maximum traction drive motor speed and traction drive motor acceleration at pre-specified power management settings. The power management settings for traction drive motor speed and acceleration may be lower than their normal settings so that electric power consumption may be reduced or minimized. Thus, the power management mode may provide an engine speed and acceleration rate for any given position of the user interface (e.g., foot or throttle pedal) that are lower than the normal settings for engine speed and acceleration. Additionally, in block 202, if power management switch 152 is in the actuated or on position, the blade motor controller may set the blade motor speed at a pre-specified power management setting that is lower than the normal setting. For example, the power management setting for blade tip speed may be 13,500 feet/minute.

In one embodiment, if power management switch 152 is in the off or normal mode position, in block 204 the traction drive motor controller may set the maximum traction drive motor speed and traction drive motor acceleration at pre-specified normal settings. The normal settings of traction drive motor speed and acceleration may be higher than the power management settings. Thus, the normal mode will provide an engine speed and acceleration rate for any given position of the user interface (e.g., foot pedal) that are higher than the power management engine speed and acceleration. Additionally, in block 204, if power management switch 152 is in the off or normal mode position, the blade motor controller may set the blade motor speed at a normal setting that is higher than the power management setting. For example, then normal setting for blade tip speed may be 16,000 feet/minute.

In one embodiment, in block 206 the blade motor controller and traction drive motor controller may process operational data regarding the blade motor and traction drive motor respectively, while operating in the power management mode. The operational data may be provided from one more sensors for the traction drive motor and the blade motor, and at regular time intervals, such as task cycles of the operating system of about every 10 milliseconds to about 20 milliseconds. The operational data may include, but is not limited to, the actual speed from traction drive motor speed sensor 142, actual instantaneous current from traction drive motor current monitor 144, actual blade rotational speed from blade motor speed monitor 130, and actual instantaneous current from blade motor current monitor 132. Current sensors may be provided in the inverter to each motor. Operational data also may include system voltage from bus 110.

In one embodiment, in block 206 the blade motor controller and traction drive motor controller may compute moving averages and/or other computations for motor speed and/or current data provided by the speed and current monitors for the blade and traction drive motors. For example, moving averages may be computed for motor speed and/or current in time windows such as about 5 seconds up to about 10 seconds. The operational data including moving averages may be stored in random access memory of the blade data storage device and traction data storage device.

In one embodiment, in block 208 the blade motor controller and traction drive motor controller may determine if any operational data in block 206 indicates high or excess loading of the blade motor and/or traction drive motor. For example, high or excess loading of the blade motor may be due to blade stall conditions and/or increased power use. Operational data showing blade stall conditions and/or increased power use by the blade motor may include, but are not limited to: (a) actual instantaneous current data from the blade motor current monitor at or exceeding a pre-specified maximum blade motor current value; (b) a moving average of actual blade motor current data exceeding a pre-specified moving average blade motor current value; (c) a decrease in actual blade rotational speed over a specified time interval; (d) a difference or ratio between commanded blade rotational speed and observed or actual blade rotational speed that exceeds a threshold over a specified time interval; or (e) an increase in the difference or ratio between commanded blade rotational speed and observed or actual blade rotational speed over successive time intervals.

In one embodiment, high or excess loading of the traction drive motor may mean increased power used by the traction drive motor. Operational data showing high or increased power use by the traction drive motor may include, but are not limited to high frequency of change of the position of user interface 150 (e.g., foot or throttle pedal). In other words, a high number of changes in the position of the foot or throttle pedal within a time interval, or positions of the foot or throttle pedal having very short duration, may indicate increased power use by the traction drive motor. Other operational data that shows high power or increased power use by the traction drive motor also may be used.

In one embodiment, in block 208, the blade motor controller and/or traction drive motor controller each may update one or more persistence counters for operational data indicating high or excess loading. Each persistence counter may be an internal software counter that may be updated or incremented when operational data that indicates high or excess loading is provided at each task cycle of the operating system. For example, the blade motor controller may increment one or more persistence counters each time blade motor current or speed data indicates high or excess loading. Similarly, the traction drive motor controller may increment one or more persistence counters each time traction drive motor data indicates high or excess loading. The persistence counters also may be decremented each time operational data does not indicate high or excess loading.

In one embodiment, in block 210 the blade motor controller and/or traction drive controller may determine if one or more persistence counters is at or above a pre-specified limit. For example, the blade motor controller may determine if a persistence counter has reached a limit for a high or excess loading condition, such as actual instantaneous current over the maximum or threshold, or the moving average of actual blade motor current over a pre-specified moving average or threshold. Similarly, the traction drive motor controller may determine if a persistence counter has reached a limit for a high or excess loading condition such as high frequency of change of the position of the user interface. If none of the persistence counters have reached the pre-specified limit, the system may return to block 200.

In one embodiment, in block 212, if the blade motor controller and/or traction drive controller determines that a persistence counter for a high or excess loading condition has reached or exceeded a pre-specified limit, the blade motor controller or traction drive motor controller may change the motor speed or performance.

In one embodiment, in block 212, if the blade motor controller determines the persistence count for a high or excess loading condition for the blade motor has been reached or exceeded, the blade motor controller may ramp up the blade motor speed and/or ramp down the traction drive motor speed. For example, the blade motor controller may command the blade speed control module to increase the blade motor speed to a higher speed than the power management speed, or to increase the blade motor speed for a specified time interval or at a specific rate. Additionally, if the blade motor controller determines the persistence count for a high or excess loading condition has been reached or exceeded, the blade motor controller and/or traction drive motor controller may command the traction speed control module to decrease the maximum speed of the traction drive motor, or decrease the speed of the traction drive motor as a function of the operator interface position.

In one embodiment, in block 212, the blade motor controller and/or traction drive motor controller may command the blade motor and traction drive motor to run at the new motor speeds until one or more high or excess loading persistence counters are below their limit. When the persistence counters are below their limit, the blade motor controller and/or traction drive motor controller may command the blade motor to return to its power management speed setting, and the traction drive motor to return to the power management speed setting for the operator interface position.

In one embodiment, in block 210, if the traction drive motor controller determines the persistence count for a high or excess loading condition for the traction drive motor has been reached or exceeded, the blade motor controller may decrease the maximum speed of the traction drive motor, decrease the speed of the traction drive motor as a function of the operator interface position, or dampen or smooth the response of the traction drive motor in response to the user interface (e.g., throttle or foot pedal). For example, the traction drive speed control module of the traction drive motor controller may command the traction drive motor to lower the maximum speed from the power management maximum speed, run at a lower speed as a function of the user interface position, or dampen or decrease the sensitivity of the traction drive motor in response to changes in the user interface position.

In one embodiment, in block 210, the traction drive motor controller may command the traction drive motor to run at the new motor speeds until one or more high or excess loading persistence counters are below their limit. At such time as the persistence counters are below their limit, the traction drive motor controller may command the traction drive motor to return to the power management speed setting for the operator interface position.

Having described the preferred embodiment, it will become apparent that various modifications can be made without departing from the scope of the invention as defined in the accompanying claims.

The following is claimed:

1. An electric lawn tractor power management system, comprising:
   a power management switch on an electric lawn tractor having a normal mode setting and a power management mode setting;
   a blade motor controller connected to the power management switch on the electric lawn tractor commanding a blade motor to rotate at a power management speed that is lower than a normal speed when the power management switch is set to the power management mode setting;
   a traction drive motor controller connected to the power management switch on the electric lawn tractor commanding a traction drive motor to rotate up to a maximum power management speed and a power management acceleration rate lower than a normal maximum speed and a normal acceleration rate when the power management switch is set to the power management mode setting;
   the blade motor controller increasing the speed of the blade motor over the power management speed in the power management mode in response to an excess loading condition based on sensors indicate power use of the blade motor or the traction drive motor exceeding pre-specified limits.

2. The electric lawn tractor power management system of claim 1 wherein the blade motor controller further comprises a blade data storage device storing blade motor speed, instantaneous current, and blade motor moving averages computed from the blade motor speed and current data.

3. The electric lawn tractor power management system of claim 1 wherein the traction drive motor controller further comprises a traction data storage device storing traction drive motor speed, instantaneous current, and traction drive motor moving averages computed from the traction drive motor speed and current data.

4. The electric lawn tractor power management system of claim 1 wherein the blade motor controller comprises a persistence counter for excess loading conditions on the blade motor.

5. The electric lawn tractor power management system of claim 1 wherein the traction drive motor controller comprises a persistence counter for excess loading conditions on the traction drive motor.

* * * * *